(12) United States Patent
Wakrat et al.

(10) Patent No.: US 8,489,907 B2
(45) Date of Patent: Jul. 16, 2013

(54) METHOD OF SELECTIVE POWER CYCLING OF COMPONENTS IN A MEMORY DEVICE INDEPENDENTLY BY REDUCING POWER TO A MEMORY ARRAY OR MEMORY CONTROLLER

(75) Inventors: Nir Jacob Wakrat, Los Altos, CA (US); Anthony Fai, Palo Alto, CA (US); Matthew Byom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 668 days.

(21) Appl. No.: 12/561,158

(22) Filed: Sep. 16, 2009

(65) Prior Publication Data

US 2011/0066869 A1    Mar. 17, 2011

(51) Int. Cl.
*G06F 1/00*    (2006.01)

(52) U.S. Cl.
USPC ............................................ 713/324; 713/300

(58) Field of Classification Search
USPC .................................................. 713/324, 300
See application file for complete search history.

(56) References Cited

U.S. PATENT DOCUMENTS

| | | | |
|---|---|---|---|
| 4,937,830 A | 6/1990 | Kawashima et al. | |
| 5,341,489 A | 8/1994 | Heiberger et al. | |
| 5,559,449 A | 9/1996 | Padoan et al. | |
| 5,604,755 A * | 2/1997 | Bertin et al. | 714/799 |
| 5,613,144 A | 3/1997 | Hall et al. | |
| 5,615,162 A | 3/1997 | Houston | |
| 5,673,223 A | 9/1997 | Park | |
| 5,751,631 A | 5/1998 | Liu et al. | |
| 6,092,158 A | 7/2000 | Harriman et al. | |
| 6,134,149 A | 10/2000 | Lin | |
| 6,148,354 A | 11/2000 | Ban et al. | |
| 6,449,111 B1 | 9/2002 | Kool et al. | |
| 6,684,301 B1 | 1/2004 | Martin | |
| 7,372,715 B2 | 5/2008 | Han | |
| 7,774,633 B1 * | 8/2010 | Harrenstien et al. | 713/323 |
| 7,975,109 B2 | 7/2011 | McWilliams et al. | |
| 7,979,658 B2 * | 7/2011 | Obereiner et al. | 711/164 |
| 2002/0194451 A1 | 12/2002 | Mukaida et al. | |
| 2003/0046628 A1 | 3/2003 | Rankin | |
| 2003/0200411 A1 | 10/2003 | Maeda et al. | |
| 2004/0139286 A1 | 7/2004 | Lin et al. | |
| 2004/0153902 A1 | 8/2004 | Machado et al. | |

(Continued)

OTHER PUBLICATIONS

Toelkes et al., "Architecture for Address Mapping of Managed Non-Volatile Memory", U.S. Appl. No. 12/614,369, filed Nov. 6, 2009.

(Continued)

*Primary Examiner* — Thomas Lee
*Assistant Examiner* — Terrell Johnson
(74) *Attorney, Agent, or Firm* — Myertons, Hood, Kivlin, Kowert & Goetzel, P.C.

(57) ABSTRACT

In a non-volatile memory system, physically separate power rails are provided from a host system to a NVM device for independently power cycling a controller and memory array in the NVM device. The controller of the NVM device can send a power cycle request signal to the host system over a host channel, or updates a status register in the NVM device. The host system receives and decodes the power cycle request signal, or reads the status register, and performs the power cycle request, which can include power cycling the controller or the memory array in the NVM device, or both. The power cycle request can be based on a power state of the non-volatile memory system, which can be managed by the controller or the host system, or both.

8 Claims, 2 Drawing Sheets

U.S. PATENT DOCUMENTS

| | | | |
|---|---|---|---|
| 2004/0257888 A1 | 12/2004 | Noguchi et al. | |
| 2005/0166007 A1 | 7/2005 | Ono | |
| 2006/0059406 A1 | 3/2006 | Micheloni et al. | |
| 2006/0164907 A1 | 7/2006 | Nguyen | |
| 2006/0248432 A1 | 11/2006 | Barrett | |
| 2007/0043900 A1 | 2/2007 | Yun | |
| 2007/0050668 A1 | 3/2007 | Gans | |
| 2007/0106919 A1* | 5/2007 | Chang et al. | 713/300 |
| 2007/0140007 A1 | 6/2007 | Terauchi | |
| 2007/0165458 A1 | 7/2007 | Leong et al. | |
| 2007/0214372 A1* | 9/2007 | Doyon et al. | 713/300 |
| 2008/0069098 A1 | 3/2008 | Shah et al. | |
| 2008/0126776 A1* | 5/2008 | Takayama | 713/1 |
| 2008/0147994 A1 | 6/2008 | Jeong et al. | |
| 2008/0195799 A1 | 8/2008 | Park et al. | |
| 2008/0211303 A1* | 9/2008 | Ikegawa | 307/29 |
| 2008/0288814 A1 | 11/2008 | Kitahara | |
| 2009/0063934 A1 | 3/2009 | Jo | |
| 2009/0089514 A1* | 4/2009 | Srivastava et al. | 711/154 |
| 2009/0100115 A1 | 4/2009 | Park et al. | |
| 2009/0113114 A1* | 4/2009 | Berenbaum et al. | 711/103 |
| 2009/0164698 A1 | 6/2009 | Ji et al. | |
| 2009/0265513 A1 | 10/2009 | Ryu | |
| 2010/0250836 A1 | 9/2010 | Sokolov et al. | |
| 2010/0296647 A1* | 11/2010 | Chan | 379/413.02 |

OTHER PUBLICATIONS

Toelkes et al., "Partial Page Operations for Non-Volatile Memory Systems", U.S. Appl. No. 12/536,410, filed Aug. 5, 2009.

Post et al., "Low Latency Read Operation for Managed Non-Volatile Memory", U.S. Appl. No. 12/538,053, filed Aug. 7, 2009.

Khmelnitsky et al., "Multipage Preparation Commands for Non-Volatile Memory Systems", U.S. Appl. No. 12/545,011, filed Aug. 20, 2009.

Wakrat et al., "Controller for Optimizing Throughput of Read Operations", U.S. Appl. No. 12/509,240, filed Jul. 24, 2009.

Wakrat et al., "File System Derived Metadata for Management of Non-Volatile Memory", U.S. Appl. No. 12/561,173, filed Sep. 16, 2009.

"Increasing Boot Operations with Managed NAND," QuickLogic® White Paper, Quicklogic Corporation [Online], Retrieved from the Internet: <http://www.quicklogic com/images/QL_Increasing_Boot_Opt_w_Managed_NAND_WP_RevE.pdf>, 2007-2009, 8 pages.

"Dual supply level translator for dual memory cards (mini SD/micro SD + managed NAND)," STMicroelectronics, Paper No. ST6G3240 [online], Retrieved from the Internet: <http://www.st.com/stonline/products/literature/ds/14581.pdf>, Apr. 2008, 29 pages.

Toshiba, "TC58NVG0S3ETA00 Toshiba Mos Digital Integrated Circuit Silicon Gate CMOS," Nov. 20, 2008, revision 1.00, Semico Toshiba, pp. 1-65. http://www.semicon.toshiba.co.jp/docs/datasheet/en/Memory/TC58NVG0S3ETA00_en_datasheet_110301.pdf.

International Search Report/Written Opinion in PCT/US2009/065804 mailed May 10, 2010, 19 pages.

Invitation to Pay Additional Fees and, Where Applicable, Protest Fee in PCT/US2009/065804 mailed Mar. 4, 2010, 4 pages.

International Search Report/Written Opinion in PCT/US2010/032628 dated Aug. 11, 2010, 12 pages.

Lim et al., "An Efficient NAND Flash File System for Flash Memory Storage," IEEE Transactions on Computers, 2006, 55(7):906-912.

International Preliminary Report on Patentability in PCT/US2009/065804 mailed Jul. 7, 2011, 12 pages.

Authorized officer Yolaine Cussac, International Preliminary Report on Patentability in PCT/US2010/32627 mailed Nov. 9, 2011, 8 pages.

International Preliminary Report on Patentability in PCT/US2010/032628 dated Nov. 9, 2011, 8 pages.

Authorized officer Jacqueline Pitard, International Search Report/Written Opinion in PCT/US2010/32627 mailed Jul. 21, 2010, 12 pages.

\* cited by examiner

METHOD OF SELECTIVE POWER CYCLING OF COMPONENTS IN A MEMORY DEVICE INDEPENDENTLY BY REDUCING POWER TO A MEMORY ARRAY OR MEMORY CONTROLLER

TECHNICAL FIELD

This subject matter is related generally to access and management of managed non-volatile memory (NVM).

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. Each block consists of a number of pages (e.g., 64-128 pages). A typical page size is 4 KB-8 KB bytes. A NAND device can have multiple dies each having 4096-8192 blocks. Associated with each page are a number of bytes that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies, which can be accessed using one or more chip select signals. A chip select is a control line used in digital electronics to select one chip out of several chips connected to the same bus. The chip select is typically a command pin on most IC packages, which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of Managed NAND solutions.

SUMMARY

In a non-volatile memory system, physically separate power rails are provided from a host system to a NVM device for independently power cycling a controller and memory array in the NVM device. The controller of the NVM device can send a power cycle request signal to the host system over a host channel or updates a status register in the NVM device. The host system receives and decodes the power cycle request signal, or reads the status register, and performs the power cycle request, which can include power cycling the controller or the memory array in the NVM device, or both. The power cycle request can be based on a power state of the non-volatile memory system, which can be managed by the controller or the host system, or both.

DETAILED DESCRIPTION

Memory System Overview

Figure 1:
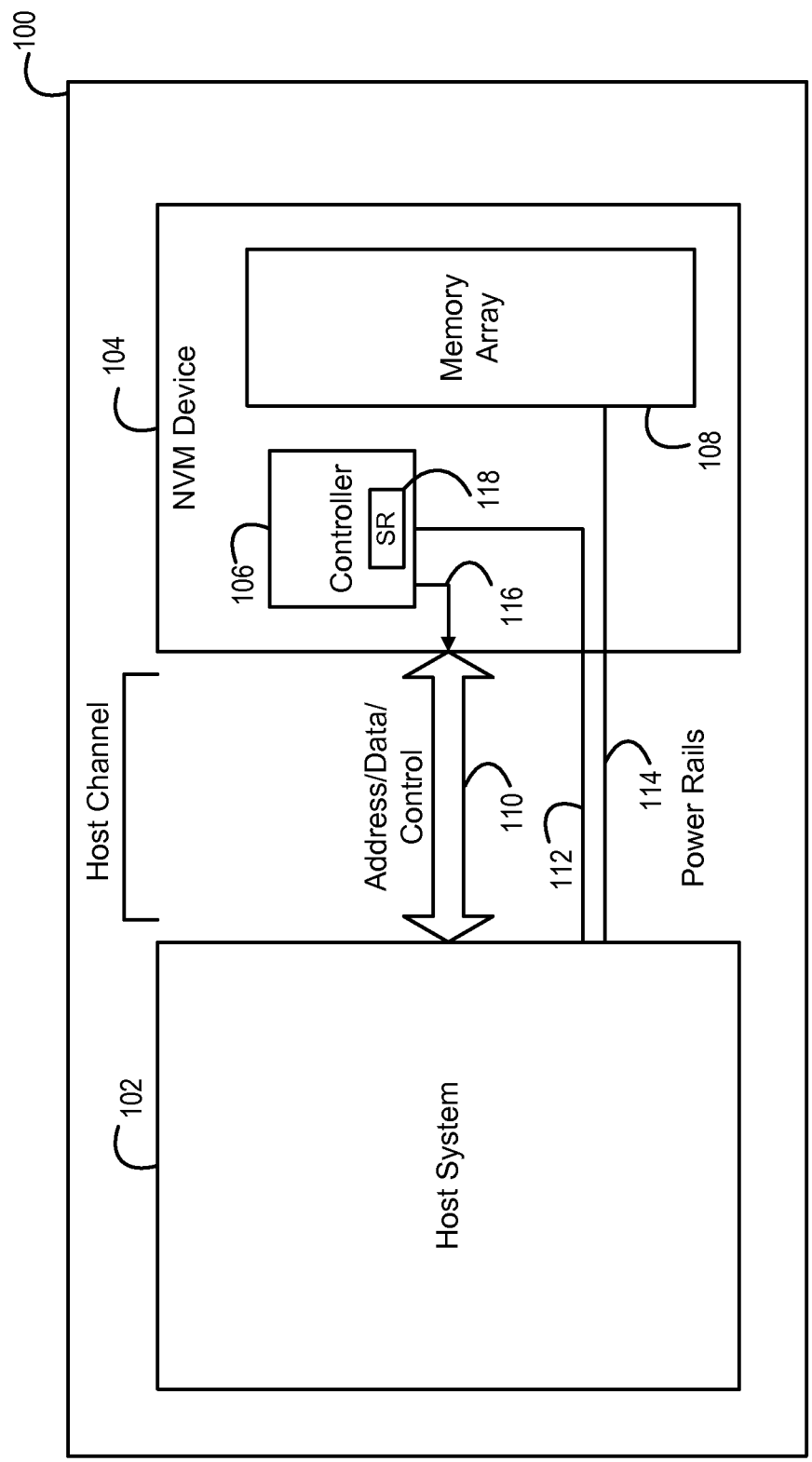
FIG. 1 is a block diagram of an example memory system including a host processor coupled to a managed NVM package.

FIG. 1 is a block diagram of an example memory system 100 including a host system 102 coupled to a NVM device 104 (e.g., a managed NAND device). The NVM device 104 can be a BGA package or other IC package, including multiple memory arrays 108 (e.g., multiple raw NAND dies). The memory system 100 can be used in a variety of devices, including but not limited to: handheld computers, mobile phones, digital cameras, portable music players, toys, thumb drives, email devices, and any other devices in which non-volatile memory is desired or required. As used herein, raw NVM is a memory device or package which is managed by an external host processor, and managed NVM is a memory device or package that includes at least one internal memory management function, such as error correction, wear leveling, bad block management, etc.

In some implementations, the NVM device 104 can include a controller 106 for accessing and managing the memory array 108 over a host channel 110. The controller 106 can perform memory management functions (e.g., wear leveling, bad block management, garbage collection) and can include an error correction (ECC) engine for detecting and correcting data errors (e.g., flipped bits). In some implementations, the ECC engine can be implemented as a hardware component in the controller 106 or as a software component executed by the controller 106.

In some implementations, the host system 102 and NVM device 104 can communicate information (e.g., control commands, addresses, data) over the host channel 110. The host channel 110 can support standard interfaces, such as raw NAND interfaces or dual channel interfaces, such as is described in ONFI specification version 2.0.

In some implementations, first and second power rails 112, 114 couple a power source in the host system 102 with the controller 106 and memory array 108, respectively. In some implementations, the host system 102 is an integrated circuit (IC) chip, and the power rails 112, 114 are connected to separate power output pins of the IC chip. The power rails 112, 114 can be coupled to one or more power sources of the host system 102.

In the example shown, the host channel 110 includes a power cycle request (RQST) signal 116. The power cycle RQST signal 116 can include one or more signals. In some implementations, the power cycle RQST signal 116 can be encoded and/or sent as part of a packet to the host system 102. The controller 106 generates the power cycle RQST signal 116 to command a processor in the host system 102 to power cycle the controller 106, or the memory array 108 or both. The host system 102 can receive the power cycle RQST signal 116 through the host channel 110. The power cycle RQST signal 116 can be generated based on a power state managed by the controller 106 and/or the host system 102. The power rails 112, 114 can be independently power cycled by the host system 102.

In some implementations, the controller 106 can update a status register (SR) 118 in the controller 106, which can be read by the host system 102 to determine if a power cycle is requested.

Example Power Cycle Process

Figure 2:
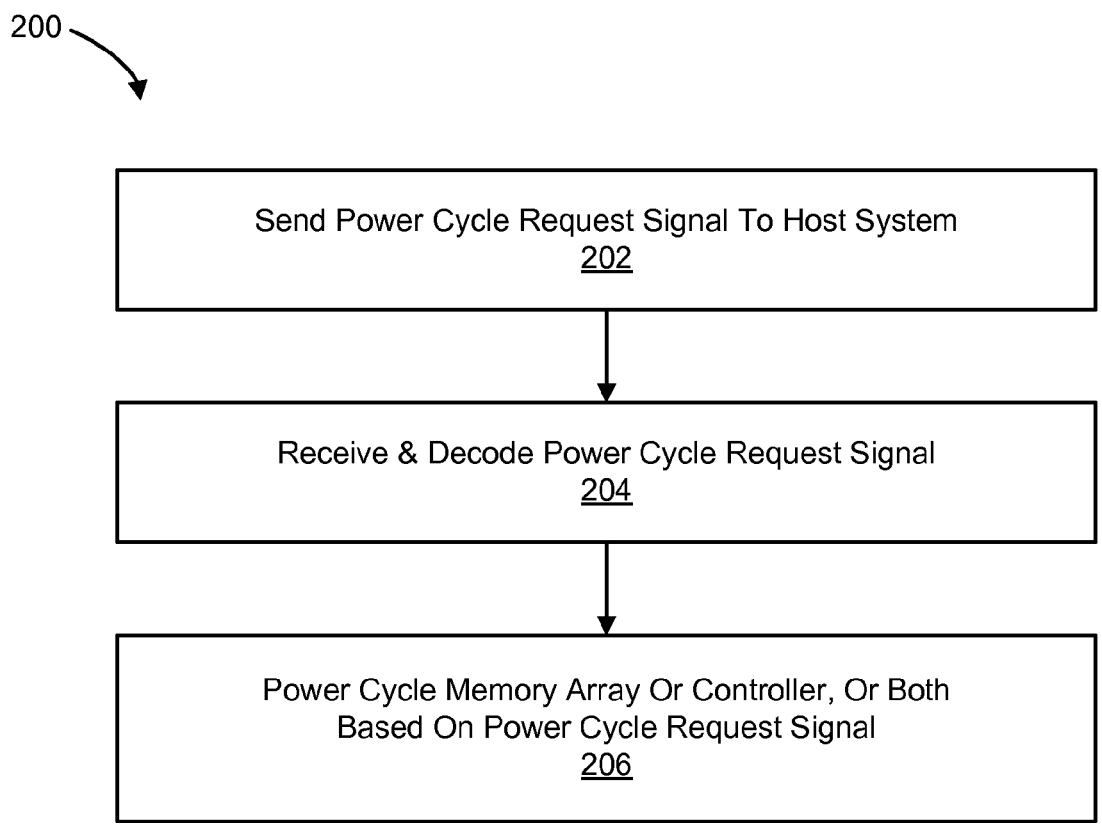
FIG. 2 is a flow diagram of an example memory array power cycling process.

FIG. 2 is a flow diagram of an exemplary process 200 performed by the non-volatile memory system 100, as described in reference to FIG. 1. In some implementations, the NVM device 104 is a managed NAND device including one or more memory arrays 108. For NVM devices 104 that include multiple dies containing multiple memory arrays 108, a separate power rail can be provided for each die or memory array 108. Alternatively, two or more memory arrays 108 on one or more dies can be power cycled together by being coupled to the same power rail.

In some implementations, the process 200 can be begin when the controller sends the power cycle request signal to the host system (202). The host system receives and decodes the power cycle request signal to determine whether to power cycle the controller, or the memory array or both (204). In some implementations, the controller can update a status register in the controller, which can be read by the host system to determine if a power cycle is requested. The host system power cycles the controller or the memory array or both based on the decoded power cycle request signal or status register contents (206).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
   reading, by a host, a status register in a controller of a non-volatile memory device to determine if a power cycle request signal is requested from the non-volatile memory device;
   decoding, by the host, contents of the status register; and
   power cycling, by the host, at least one of the controller or a memory array of the non-volatile memory device based on the status register contents, wherein the power cycling includes reducing the power to a first power rail coupled to the controller.

2. The method of claim 1, wherein power cycling includes turning off the power to the first power rail, or turning off the power or reducing the power to a second power rail coupled to the memory array.

3. The method of claim 1, where the non-volatile memory device is a managed NAND device.

4. The method of claim 1, where the power cycle request is based on a power state.

5. A non-volatile memory system, comprising:
   a host system;
   a non-volatile memory device coupled to the host system;
   a memory array included in the non-volatile memory device and coupled to a power source in the host system by a first power rail; and
   a controller included in the non-volatile memory device and coupled to the power source, or a different power source of the host system, by a second power rail;
   wherein the controller is configurable for updating contents of a status register in the controller, and the host system is configurable for reading the status register and performing a power cycle on the first power rail or the second power rail based on the contents of the status register, wherein performing the power cycling includes reducing the power to the first power rail.

6. The system of claim 5, where the non-volatile memory device is a managed NAND device.

7. The system of claim 5, where the power cycle is based on a power state of the non-volatile memory system.

8. The system of claim 5, where the non-volatile memory device includes a number of memory arrays, at least two of which can be power cycled through the first power rail.

* * * * *